United States Patent
Harris (10) Patent No.: US 10,519,897 B2
(45) Date of Patent: Dec. 31, 2019

(54) DIVERGENT FLAP

(71) Applicant: United Technologies Corporation, Farmington, CT (US)

(72) Inventor: Meggan Harris, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 467 days.

(21) Appl. No.: 15/028,141

(22) PCT Filed: Jan. 21, 2015

(86) PCT No.: PCT/US2015/012180
§ 371 (c)(1),
(2) Date: Apr. 8, 2016

(87) PCT Pub. No.: WO2015/112554
PCT Pub. Date: Jul. 30, 2015

(65) Prior Publication Data
US 2016/0237948 A1   Aug. 18, 2016

Related U.S. Application Data (60) Provisional application No. 61/931,057, filed on Jan. 24, 2014.

(51) Int. Cl.
*F02K 1/12* (2006.01)
*F02K 1/82* (2006.01)
(Continued)

(52) U.S. Cl.
CPC ............ *F02K 1/1223* (2013.01); *B64D 33/04* (2013.01); *F02K 1/822* (2013.01); *F02K 9/972* (2013.01);
(Continued)

(58) Field of Classification Search
CPC ........ F02K 1/1223; F02K 1/1207; F02K 1/12; F02K 1/822; F02K 1/06; F02K 1/11;
(Continued)

(56) References Cited

U.S. PATENT DOCUMENTS

| | | | | |
|---|---|---|---|---|
| 3,798,902 A | * | 3/1974 | Butter | F02K 9/64 165/146 |
| 4,544,098 A | * | 10/1985 | Warburton | F02K 1/1223 239/127.3 |

(Continued)

OTHER PUBLICATIONS

International Search Report and Written Opinion, International Application No. PCT/US2015/012180, dated May 7, 2015, 12 pages.

(Continued)

*Primary Examiner* — Andrew H Nguyen
*Assistant Examiner* — Stephanie Cheng
(74) *Attorney, Agent, or Firm* — Kinney & Lange, P.A.

(57) ABSTRACT

A divergent flap includes a hinge joint to connect the divergent flap to a convergent flap, a plow structure, a first wall, a second wall, and two side walls. The plow structure is at a plow end of the flap opposite the hinge joint. The first wall and the second wall each extend from the hinge joint to the plow end. The second wall is spaced apart from the first wall by the two side walls to form at least one cooling channel extending between the hinge joint and the plow end. The divergent flap is integrally formed in layer-by-layer fashion as a single piece.

18 Claims, 5 Drawing Sheets

(51) Int. Cl.
*F02K 9/97* (2006.01)
*B64D 33/04* (2006.01)

(52) U.S. Cl.
CPC .... *F05D 2230/31* (2013.01); *F05D 2240/128* (2013.01); *F05D 2260/202* (2013.01)

(58) Field of Classification Search
CPC ...... F02K 1/123; F02K 1/1253; F02K 1/1261; F02K 9/972; F05D 2230/31; F05D 2230/312; F05D 2230/313; F05D 2240/128; F05D 2260/20; F05D 2260/201; F05D 2260/202; F05D 2260/203; F05D 2260/204; B64D 33/04; F02C 7/12; F02C 7/18
See application file for complete search history.

(56) References Cited

U.S. PATENT DOCUMENTS

| | | | | |
|---|---|---|---|---|
| 5,720,434 | A * | 2/1998 | Vdoviak | F02K 1/12 239/127.1 |
| 6,964,169 | B2 * | 11/2005 | Pancou | F02K 1/002 264/136 |
| 7,213,393 | B2 * | 5/2007 | Lapergue | F02K 1/1223 239/265.37 |
| 2004/0003585 | A1 * | 1/2004 | Allore | F02K 1/06 60/266 |
| 2005/0060984 | A1 | 3/2005 | Prouteau et al. | |
| 2005/0161527 | A1 | 7/2005 | Murphy et al. | |
| 2005/0257529 | A1 * | 11/2005 | Arbona | F02K 1/12 60/771 |
| 2006/0266016 | A1 | 11/2006 | Cowan et al. | |
| 2007/0186555 | A1 * | 8/2007 | Peters | F02K 1/12 60/770 |
| 2007/0234728 | A1 * | 10/2007 | Peters | F02K 1/1223 60/771 |
| 2009/0072490 | A1 * | 3/2009 | Cowan | F02K 1/1223 277/562 |
| 2014/0130501 | A1 * | 5/2014 | Clemen | F23R 3/00 60/722 |
| 2014/0338347 | A1 * | 11/2014 | Gage | F23R 3/06 60/754 |

OTHER PUBLICATIONS

Extended European Search Report for EP Application No. 15740695.0, dated Jan. 12, 2017, 8 Pages.
International Preliminary Report on Patentability, for PCT Patent Application No. PCT/US2015/012180, dated Jul. 26, 2016, 11 pages.

* cited by examiner

DIVERGENT FLAP

BACKGROUND

The present invention relates to convergent and divergent nozzles for gas turbine engines. In particular, the present invention relates to a divergent flap for a convergent and divergent nozzle.

Gas turbine engines employed for high-performance aircraft may employ an exhaust nozzle aft of a turbine. The exhaust nozzle may include a convergent section having a decreasing cross-sectional area in the direction of exhaust flow, and a divergent section having an increasing cross-sectional area in the direction of exhaust flow. Such a device is referred to as a convergent and divergent nozzle. The plane of minimum cross-sectional area along the exhaust flow path through the nozzle is called the throat. The nozzle geometry and throat area for some convergent and divergent nozzles may be varied to provide improved engine performance under a wide range of operating conditions. Variable geometry may be provided by a series of convergent flaps forming the convergent section and hinged to a series of divergent flaps forming the divergent section.

The divergent flaps in particular, are complex parts which may include a number of components such as castings and sheet metal assemblies. The divergent flap may also include cooling channels internal to the castings and sheet metal assemblies. Producing these various components and assembling them into a divergent flap such that the internal cooling channels align and are functional is a costly and time consuming task. A more economical method of manufacturing a divergent flap is desired.

SUMMARY

An embodiment of the present invention is a divergent flap including a hinge joint to connect the divergent flap to a convergent flap, a plow structure, a first wall, a second wall, and two side walls. The plow structure is at a plow end of the flap opposite the hinge joint. The first wall and the second wall each extend from the hinge joint to the plow end. The second wall is spaced apart from the first wall by the two side walls to form at least one cooling channel extending between the hinge joint and the plow end. The divergent flap is integrally formed in layer-by-layer fashion as a single piece.

Another embodiment of the present invention is a method for making a divergent flap for a convergent and divergent nozzle. The method includes building the divergent flap by a layer-by-layer additive manufacturing process. The method also includes forming, while building the divergent flap, a hinge joint and a plow structure at a plow end of the flap opposite the hinge joint. The method includes integrally forming at least one cooling channel together with the hinge joint and the plow structure, the cooling channel extending between the hinge joint and the plow end.

DETAILED DESCRIPTION

Figure 1:
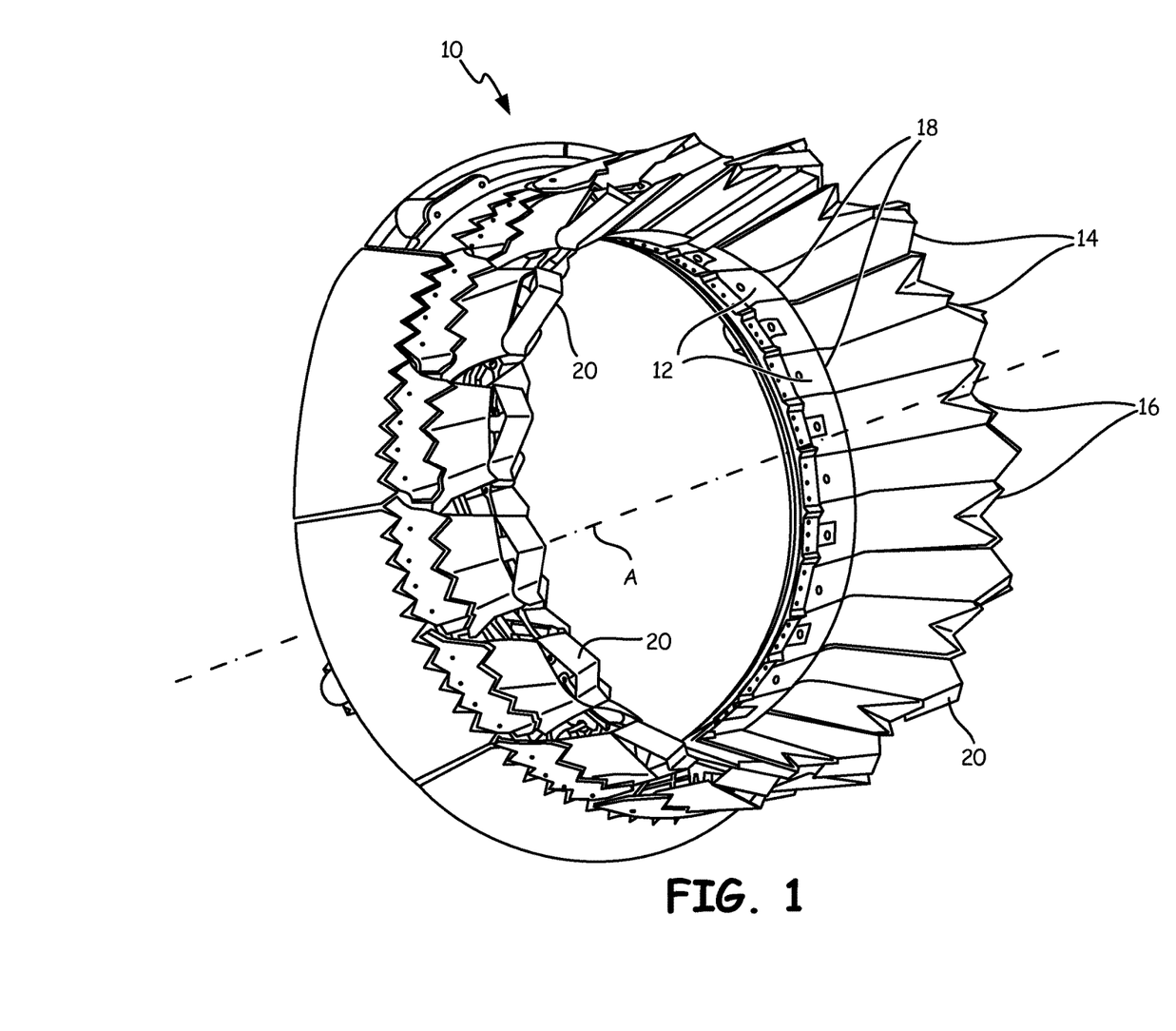
FIG. 1 is a perspective view of a convergent/divergent nozzle.

FIG. 1 shows a perspective view of a convergent and divergent nozzle suitable for use with divergent flaps embodying the present invention. FIG. 1 shows convergent and divergent nozzle 10 including convergent flaps 12, divergent flaps 14, and flap seals 16. Convergent flaps 12 are arranged circumferentially around axis A of nozzle 10 to form a generally convergent portion of an interior of nozzle 10. Divergent flaps 14 are arranged circumferentially around axis A to form a generally divergent portion of the interior of nozzle 10. Flap seal 16 extends between adjacent divergent flaps 14 to varying degrees depending upon the desired nozzle geometry to prevent leakage of hot nozzle exhaust gases from the interior of nozzle 10, and loss of thrust. Divergent flaps 14 and flap seal 16 alternate around the circumference of axis A. A forward end of each divergent flap 14 is pivotally mounted to an aft end of a convergent flap 12 by hinge joint 18. Each divergent flap 14 includes plow structure 20 at an aft-most end of divergent flap 14. Plow structure 20 is a plow-shaped device having sides angled approximately 45 degrees from axis A. Plow structure 20 provides desired aerodynamic characteristics and a reduced radar signature at what is generally an aft-most portion of a gas turbine engine.

In operation, the geometry of nozzle 10, in particular the relative angles of the generally convergent portion of nozzle 10 formed by convergent flaps 12 and the generally divergent portion of nozzle 10 formed by divergent flaps 14, varies as divergent flaps 14 pivot about hinge joint 18. In this way, a throat diameter of nozzle 10 is adjusted for improved performance under varying engine operating conditions.

Figure 2:
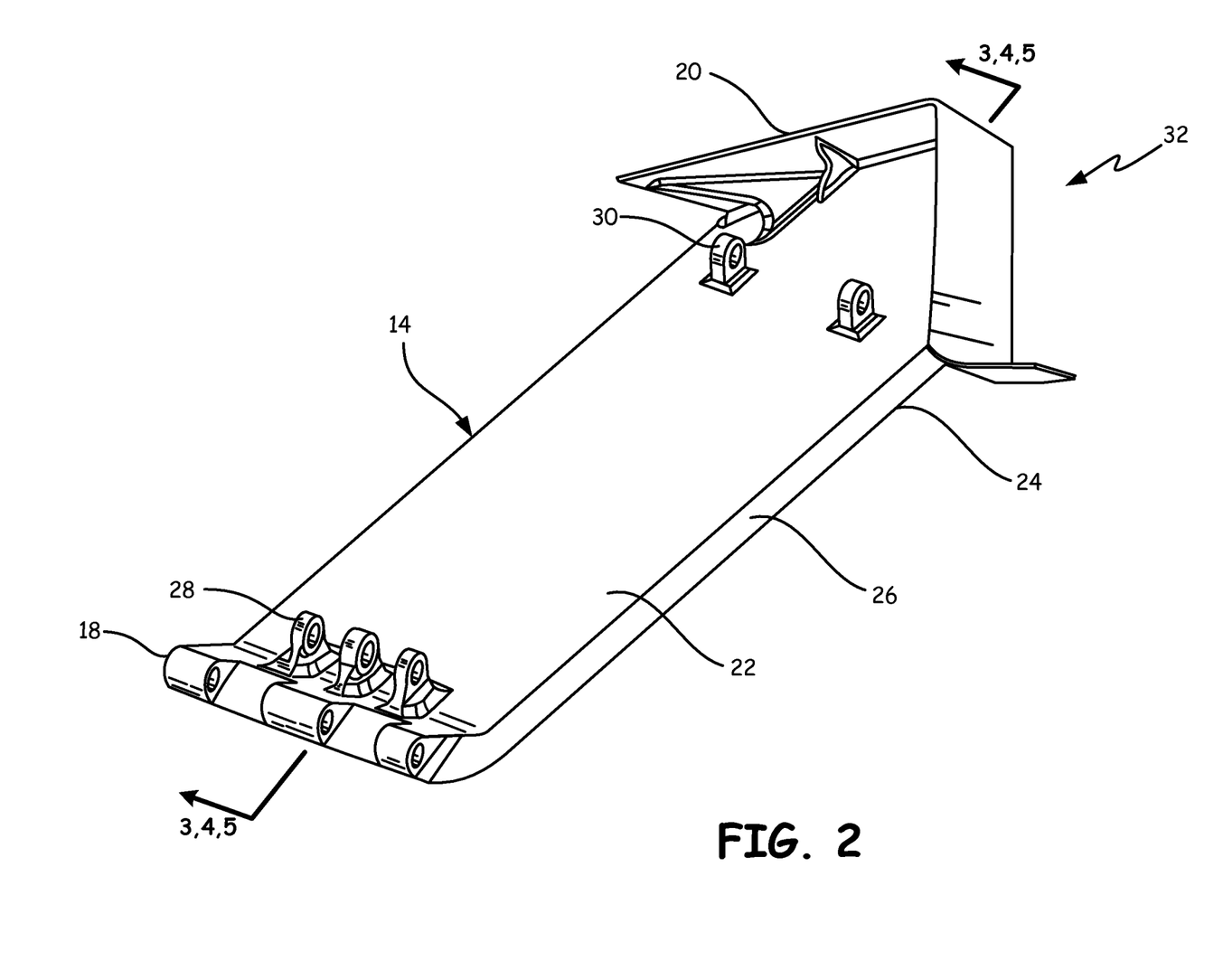
FIG. 2 is a perspective view of a divergent flap embodying the present invention.

FIG. 2 is a perspective view of an embodiment of a divergent flap. Divergent flap 14 includes hinge joint 18, plow structure 20, first wall 22, second wall 24, and side walls 26 (one shown). Divergent flap 14 also includes forward connection joint 28 and aft connection joint 30. Hinge joint 18 is disposed at one end of divergent flap 14 to pivotally connect divergent flap 14 to a convergent flap, such as convergent flap 12 described above. Plow structure 20 is disposed at plow end 32 which is an end of divergent flap 14 opposite that of hinge joint 18. First wall 22 extends from hinge joint 18 to plow end 32. Second wall 24 (FIG. 3) also extends from hinge joint 18 to plow end 32 and is spaced apart from first wall 22 by side walls 26 (one visible). Forward connection joint 28 and aft connection joint 30 are hinged connections to mechanisms (not shown) for controlling movement of divergent flap 14.

Figure 3:
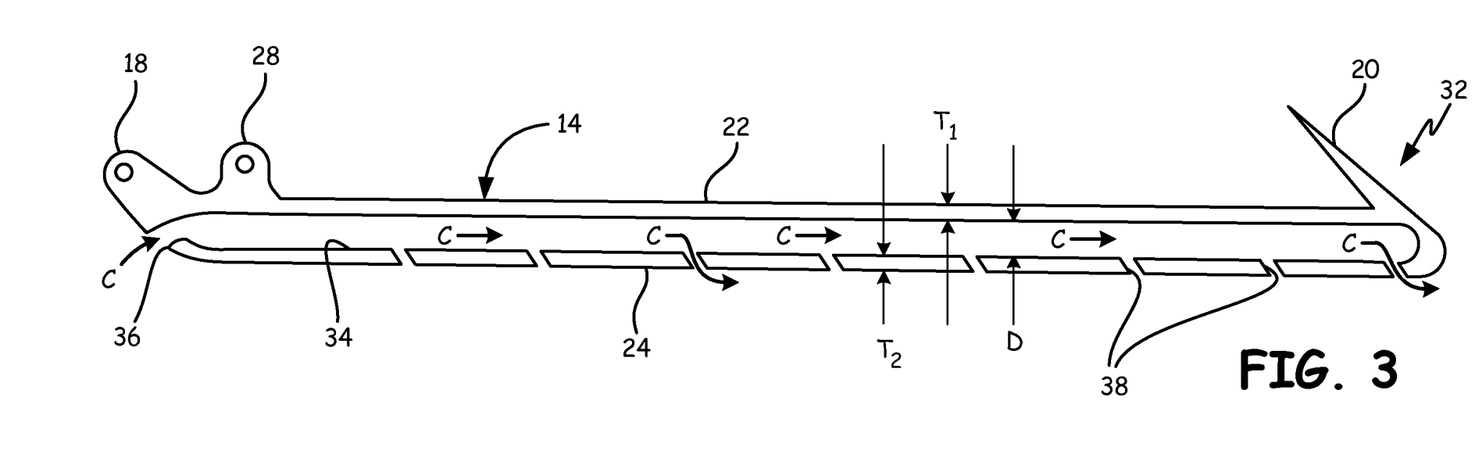
FIG. 3 is a lengthwise cross-sectional view of the divergent flap of FIG. 2.

FIG. 3 is a lengthwise cross-sectional view of divergent flap 14 of FIG. 2. As shown in FIG. 3, second wall 24 extends from hinge joint 18 to plow end 32 and is spaced apart from first wall 22 by side walls 26 (FIG. 2) to form at least one cooling channel 34. Cooling channel 34 extends between hinge joint 18 and plow end 32. Cooling air C may flow into cooling channel 34 by way of cooling air inlet 36. Cooling air inlet 36 may be disposed at an end of cooling channel 34 adjacent to hinge joint 18. In use, second wall 24 faces the hot exhaust gases, thus second wall 24 includes a plurality of effusion cooling holes 38. Effusion cooling holes 38 are fluidly connected to cooling channel 34. Effusion cooling holes 38 are designed to pass relatively cool air along an exterior surface of second wall 24. In effusion cooling, the cooling air C passed out of effusion cooling holes 38 preferably forms a cooling film, along the exterior surface of second wall 24, which prevents direct convective thermal transfer between the hot exhaust gases and second wall 24. Effusion cooling holes 38 are formed at a shallow angle through second wall 24 to aid in formation of a cooling film along second wall 24, providing thermal protection for divergent flap 14.

Divergent flap 14 is manufactured by building divergent flap 14 by a layer-by-layer additive manufacturing process; forming, while building divergent flap 14, hinge joint 18, plow structure 20 at plow end 32; and integrally forming at least one cooling channel 34 together with hinge joint 18 and plow structure 20, cooling channel 34 extending between hinge joint 18 and plow end 32. Manufacturing of divergent flap 14 may also include integrally forming effusion cooling holes 38 together with cooling channel 34. Thus, divergent flap 14 is integrally formed together as a stack of layers of material during an additive manufacturing process. In this way, divergent flap 14 may be manufactured, for example, with wall thickness $T_1$ of first wall 22 that is uniform between hinge joint 18 and plow end 32, a wall thickness $T_2$ of second wall 24 that is also uniform between hinge joint 18 and plow end 32, and distance D between first wall 22 and second wall 24 that is uniform between hinge joint 18 and plow end 32, as shown in FIG. 3. Thus, divergent flap 14 is a complex part which may be difficult, if not impossible, to manufacture as an assembly of castings and sheet metal assemblies.

Figure 4:
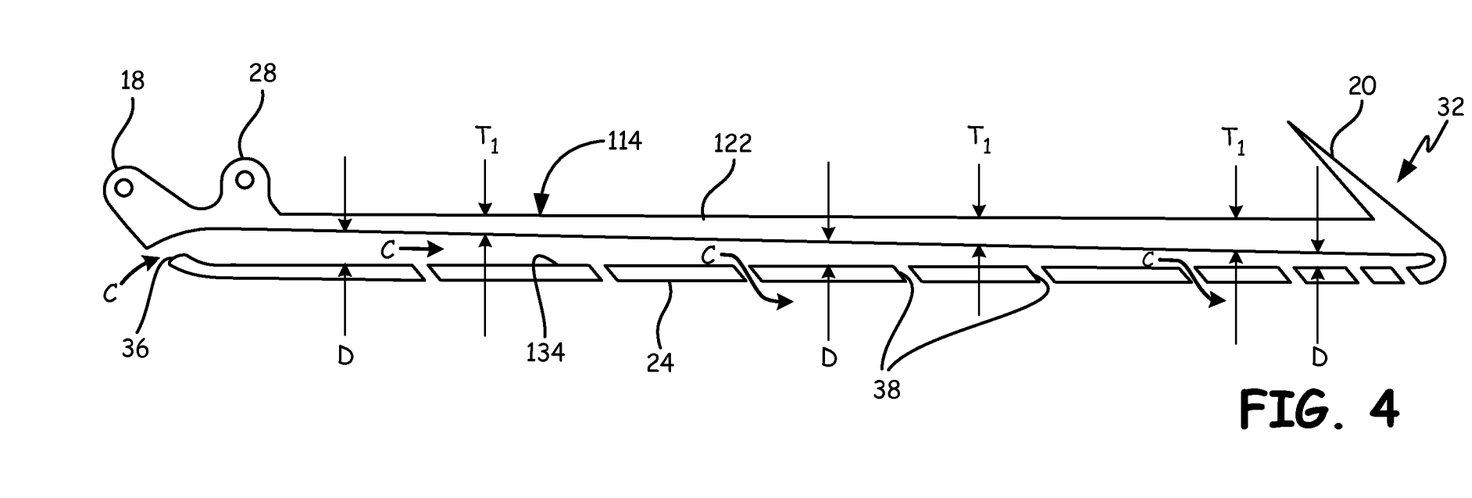
FIG. 4 is a lengthwise cross-sectional view of another divergent flap embodying the present invention.

Additive manufacturing allows characteristics of a divergent flap to be tailored for a variety design requirements. FIG. 4 further illustrates this feature. FIG. 4 is a lengthwise cross-sectional view of another divergent flap embodying the present invention. As with the embodiment described above in reference to FIG. 3, the embodiment described in FIG. 4 is also integrally formed together as a stack of layers of material during an additive manufacturing process. FIG. 4 shows divergent flap 114, which is identical to divergent flap 14 described above in reference to FIG. 3, except that first wall 22 is replaced by first wall 122, and cooling channel 34 is replace by cooling channel 134. As shown in FIG. 4, first wall 122 has a wall thickness $T_1$ that increases between hinge joint 18 and plow end 32, and distance D between first wall 122 and second wall 24 decreases between hinge joint 18 and plow end 32 to define cooling channel 134. This embodiment provides for additional mechanical strength at plow end 32 due to the increase in wall thickness $T_1$. In addition, cooling channel 134 produces increased convective cooling at plow end 32 due to the variation in distance D between hinge joint 18 and plow end 32. Specifically, distance D decreases between hinge joint 18 and plow end 32 causing the speed of cooling air C flowing past first wall 122 and second wall 24 to increase, thus increasing convective heat transfer from first wall 122 and second wall 24 into cooling air C.

Figure 5:
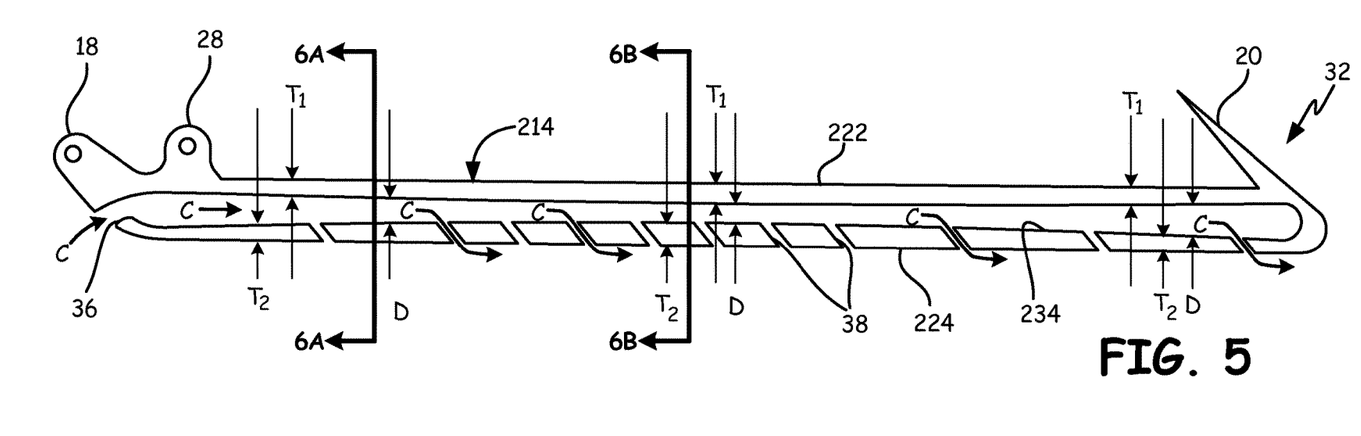
FIG. 5 is a lengthwise cross-sectional view of yet another divergent flap embodying the present invention.

FIG. 5 is a lengthwise cross-sectional view of yet another divergent flap embodying the present invention. The embodiment of FIG. 5 is heavily tailored by virtue of the additive manufacturing process described above in reference to FIG. 1 to provide precise cooling. FIG. 5 shows divergent flap 214, which is identical to divergent flap 114 described above in reference to FIG. 4, except that first wall 122 is replaced by first wall 222, second wall 24 is replaced by second wall 224, and cooling channel 134 is replaced by cooling channel 234. As shown in FIG. 5, first wall 222 has a wall thickness $T_1$ that increases, and then decreases, between hinge joint 18 and plow end 32. Similarly, second wall 224 has a wall thickness $T_2$ that increases, and then decreases, between hinge joint 18 and plow end 32. As a result, cooling channel 134 is replaced by cooling channel 234 because distance D between first wall 222 and second wall 224 decreases, and then increases between hinge joint 18 and plow end 32. This embodiment provides for additional mechanical strength between hinge joint 18 and plow end 32 due to the increase in wall thickness $T_1$. In addition, cooling channel 234 produces increased convective cooling between hinge joint 18 and plow end 32 due to the variation in distance D between hinge joint 18 and plow end 32.

Figure 6A:
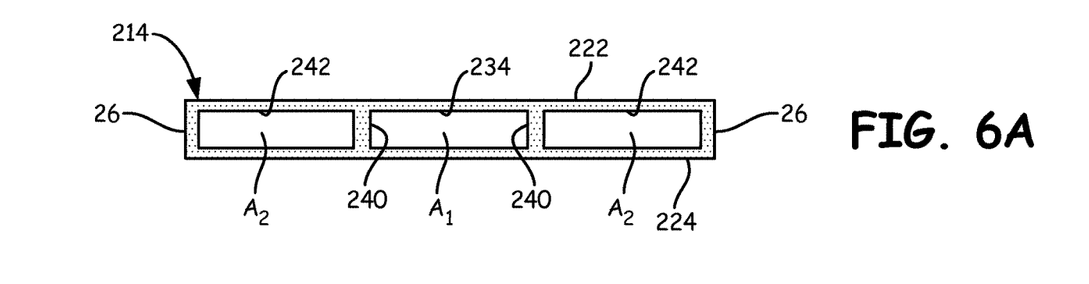
FIGS. 6A and 6B are widthwise cross-sectional views of the divergent flap shown in FIG. 5 along its length.
Figure 6B:
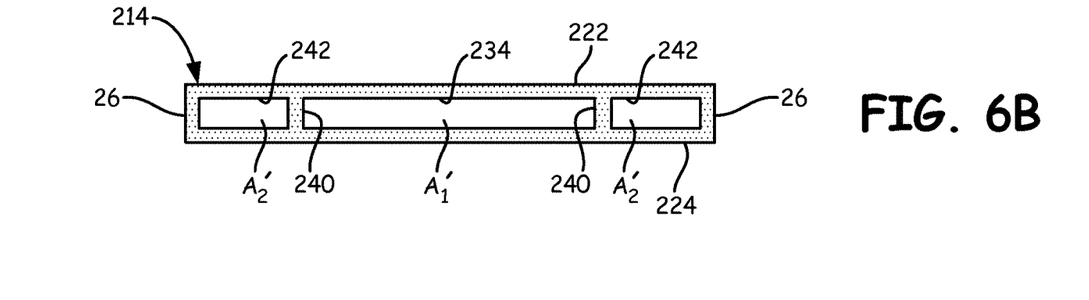

FIGS. 6A and 6B are widthwise cross-sectional views of divergent flap 214 shown in FIG. 5 at two locations along its length. FIG. 6A is away from a middle of divergent flap 214 and nearer hinge joint 18. FIG. 6B is near the middle of divergent flap 214. As shown in FIGS. 6A and 6B, divergent flap 214 further includes interior walls 240. Interior walls 240 are between side walls 26 and extend between first wall 222 and second wall 224. In the embodiment shown in FIGS. 6A and 6B, there are two interior walls 240 which, together with first wall 222, second wall 224, and side walls 26, form a plurality of cooling channels, including cooling channel 234 in the middle of divergent flap 214, and side cooling channels 242 on either side of cooling channel 234. Each of cooling channel 234 and side cooling channels 242 extend between hinge joint 18 and plow end 32.

As shown in FIGS. 6A and 6B, cooling channel 234 has cross-sectional area $A_1$ at the location shown in FIG. 6A, and a cross-sectional area $A_1'$ at the location shown in FIG. 6B. Side cooling channels 242 each have cross-sectional area $A_2$ at the location shown in FIG. 6A, and cross-sectional areas $A_2'$ at the locations shown in FIG. 6B. At the location of divergent flap 214 illustrated by FIG. 6A, interior walls 240 are disposed such that each of the plurality of cooling channels 234, 242 has approximately the same cross-sectional area, that is, $A_1$ equals $A_2$. As shown in FIG. 6B, interior walls 240 are disposed closer to the nearest side wall 26, such that the cross-sectional area of cooling channel 234 is greater than the cross-sectional areas of side cooling channels 242, that is, $A_1'$ is greater than $A_2'$. The arrangement tailors the convective cooling provided at different locations on divergent flap 214 to the specific needs at each location.

Figure 7:
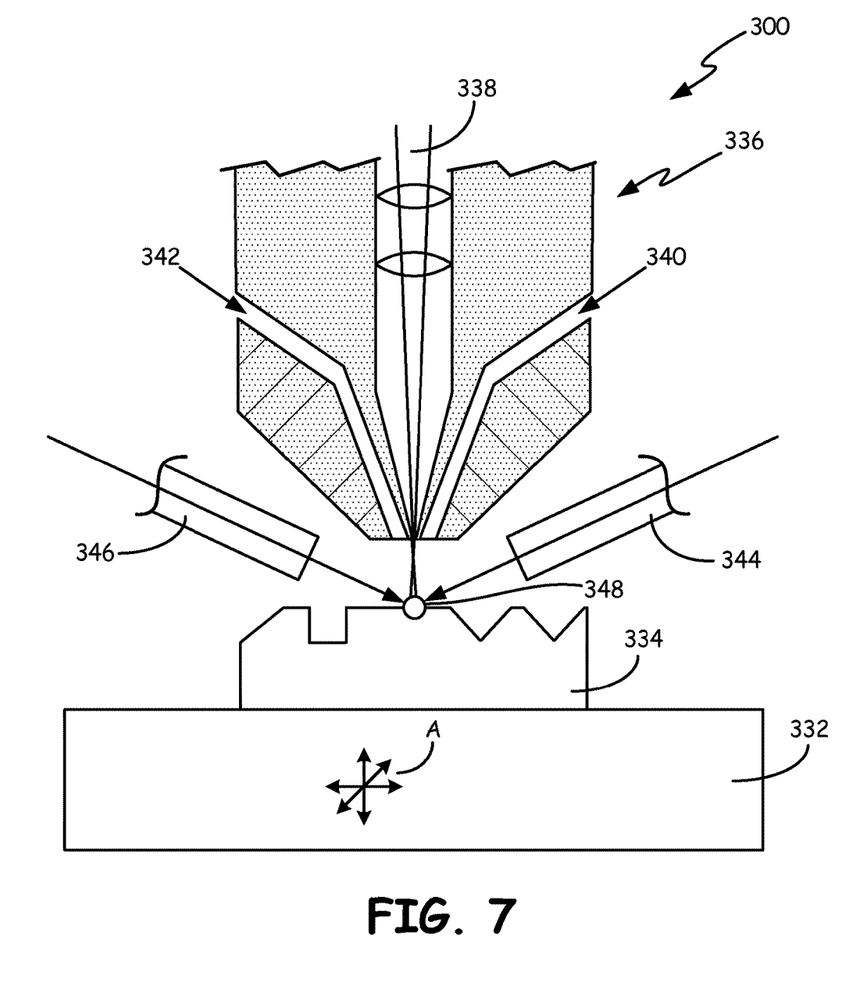
FIG. 7 is a cross-sectional view of an additive manufacturing apparatus which may be used to integrally form a divergent flap embodying the present invention.

FIG. 7 is a cross-sectional view of an additive manufacturing apparatus which may be used to integrally form a divergent flap embodying the present invention. FIG. 7 illustrates laser powder deposition (LPD) apparatus 300. LPD apparatus 300 includes base 332, divergent flap 334, deposition unit 336, and sensors 344 and 346. Base 332 is capable of three axis computer controlled positioning as schematically indicated by arrows A. Deposition unit 336 contains channels 340 and 342 that may carry deposition powders and inert gas to the deposition site. Deposition unit 336 further contains a laser energy source (not shown) forming laser 338. Deposition unit 336 is capable of five axis computer controlled positioning during a build. Output from sensors 344 and 346 is used to control the build of divergent flap 334. Divergent flap 334 is formed by laser 338 melting small region 348 on divergent flap 334 into which powders are introduced through channels 340 and 342. The build is a point-by-point, layer-by-layer process according to a CAD model of divergent flap 334 model stored in memory of the control system (not shown) of LPD apparatus 300.

FIG. 7 shows one possible way of additively manufacturing a divergent flap embodying the present invention. Alternative methods for additively manufacturing components are possible. For example, direct metal laser sintering, selective laser sintering, electron beam melting, or electron beam wire manufacturing may be used to create objects in an additive fashion. In all cases, a divergent flap embodying the present invention is integrally formed as a stack of layers of material to create a structure integrally formed as a single piece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A divergent flap includes a hinge joint, a plow structure, a first wall, two side walls, and a second wall. The hinge joint is to connect the divergent flap to at least a convergent flap. The plow structure is at a plow end of the flap opposite the hinge joint. The first wall extends from the hinge joint to the plow end. The second wall extends from the hinge joint to the plow end. The second wall is spaced apart from the first wall by the two side walls to form at least one cooling channel extending between the hinge joint and the plow end. The divergent flap is integrally formed in layer-by-layer fashion as a single piece.

The divergent flap of the preceding paragraph can optionally include, additionally and/or alternatively, any one or more of the following features, configurations, and/or additional components:

the second wall includes a plurality of effusion cooling holes fluidly connected to the cooling channel;

a distance between the first wall and the second wall varies between the hinge joint and the plow end;

a thickness of at least one of the first wall and the second wall does not vary between the hinge joint and the plow end;

at least one interior wall between the two side walls and extending from the first wall to the second wall to form with the first wall, the second wall, and the two side walls, a plurality of cooling channels extending between the hinge joint and the plow end;

a cross-sectional area of at least one of the cooling channels is not equal to the cross-sectional area of another of the cooling channels;

a distance between the interior wall and the two side walls varies between the hinge joint and the plow end; and a distance between the first wall and the second wall varies between the hinge joint and the plow end.

A convergent and divergent nozzle includes a plurality of convergent flaps, and a plurality of divergent flaps. The convergent flaps are arranged circumferentially around an axis of the nozzle. The divergent flaps are also arranged circumferentially around the axis of the nozzle. Each of the divergent flaps is pivotally mounted to a convergent flap. Each of the divergent flaps includes a hinge joint, a plow structure, a first wall, two side walls, and a second wall. The hinge joint is to connect the divergent flap to the convergent flap. The plow structure is at a plow end of the flap opposite the hinge joint. The first wall extends from the hinge joint to the plow end. The second wall faces the axis of the nozzle and extends from the hinge joint to the plow end. The second wall is spaced apart from the first wall by the two side walls to form at least one cooling channel extending between the hinge joint and the plow end. The divergent flap is integrally formed in layer-by-layer fashion as a single piece.

The nozzle of the preceding paragraph can optionally include, additionally and/or alternatively, any one or more of the following features, configurations, and/or additional components:

the second wall of each of the divergent flaps includes a plurality of effusion cooling holes fluidly connected to the cooling channel;

a distance between the first wall and the second wall of each of the divergent flaps varies between the hinge joint and the plow end;

a thickness of at least one of the first wall and the second wall of each of the divergent flaps does not vary between the hinge joint and the plow end;

each of the divergent flaps further includes at least one interior wall between the two side walls and extending from the first wall to the second wall to form with the first wall, the second wall, and the two side walls, a plurality of cooling channels extending between the hinge joint and the plow end;

a cross-sectional area of at least one of the cooling channels of each of the divergent flaps is not equal to the cross-sectional area of another of the cooling channels;

a distance between the interior wall and two side walls of each of the divergent flaps varies between the hinge joint and the plow end; and a distance between the first wall and the second wall of each of the divergent flaps varies between the hinge joint and the plow end.

A method for making a divergent flap for a convergent and divergent nozzle includes building the divergent flap by a layer-by-layer additive manufacturing process. The method also includes forming, while building the divergent flap, a hinge joint and a plow structure at a plow end of the flap opposite the hinge joint. The method includes integrally forming at least one cooling channel together with the hinge joint and the plow structure, the cooling channel extending between the hinge joint and the plow end.

The method of the preceding paragraph can optionally include, additionally and/or alternatively, any one or more of the following features, configurations, and/or additional components:

integrally forming with the at least one cooling channel, a plurality of effusion cooling holes fluidly connecting the cooling channel to an exterior surface of the divergent flap;

integrally forming a plurality of cooling channels together with the hinge joint and the plow structure, each of the plurality of cooling channels extending between the hinge joint to the plow end; and additively manufacturing includes using laser powder deposition.

The invention claimed is:

1. A divergent flap for a convergent and divergent nozzle comprising:
   a hinge joint to connect the divergent flap to at least a convergent flap of the convergent and divergent nozzle;
   a plow structure at a plow end of the divergent flap opposite the hinge joint;

a first wall extending from the hinge joint to the plow end;
two side walls; and
a second wall extending from the hinge joint to the plow end, the second wall spaced apart from the first wall by the two side walls to form at least one cooling channel extending between the hinge joint and the plow end, the second wall having a thickness that increases from the hinge joint to a middle of the divergent flap and decreases from the middle of the divergent flap to the plow end;
wherein a distance between the first wall and the second wall decreases from the hinge joint to the middle of the divergent flap and increases from the middle of the divergent flap to the plow end to produce increased convective cooling between the hinge joint and the plow end, and
wherein the divergent flap is integrally formed in layer-by-layer fashion as a single piece.

2. The divergent flap of claim 1, wherein the second wall includes a plurality of effusion cooling holes fluidly connected to the at least one cooling channel.

3. The divergent flap of claim 1, further including at least one interior wall between the two side walls and extending from the first wall to the second wall to form with the first wall, the second wall, and the two side walls, three cooling channels of the at least one cooling channel extending between the hinge joint and the plow end.

4. The divergent flap of claim 3, wherein a cross-sectional area of at least one of the three cooling channels is not equal to the cross-sectional area of another of the three cooling channels.

5. The divergent flap of claim 3, wherein a distance between the interior wall and the two side walls varies between the hinge joint and the plow end.

6. The divergent flap of claim 1, wherein a distance between the first wall and the second wall varies between the hinge joint and the plow end.

7. A convergent and divergent nozzle comprising:
a plurality of convergent flaps arranged circumferentially around an axis of the nozzle; and
a plurality of divergent flaps arranged circumferentially around the axis of the nozzle,
each of the divergent flaps pivotally mounted to a corresponding convergent flap of the plurality of convergent flaps, each of the divergent flaps including:
a hinge joint to connect the divergent flap to the corresponding convergent flap;
a plow structure at a plow end of the divergent flap opposite the hinge joint;
a first wall extending from the hinge joint to the plow end;
two side walls; and
a second wall facing the axis of the nozzle and extending from the hinge joint to the plow end, the second wall spaced apart from the first wall by the two side walls to form at least one cooling channel extending between the hinge joint and the plow end with the second wall having a thickness that gradually increases from the hinge joint towards a middle of the second wall and gradually decreases between the middle of the second wall and the plow end;
wherein a distance between the first wall and the second wall decreases from the hinge joint to a middle of the divergent flap and increases from the middle of the divergent flap to the plow end to produce increased convective cooling between the hinge joint and the plow end;
wherein the divergent flap is integrally formed in layer-by-layer fashion as a single piece.

8. The nozzle of claim 7, wherein the second wall of each of the divergent flaps includes a plurality of effusion cooling holes fluidly connected to the at least one cooling channel.

9. The nozzle of claim 7, wherein a distance between the first wall and the second wall of each of the divergent flaps varies between the hinge joint and the plow end.

10. The nozzle of claim 7, wherein a thickness of the first wall of each of the divergent flaps does not vary between the hinge joint and the plow end.

11. The nozzle of claim 7, wherein each of the divergent flaps further includes at least one interior wall between the two side walls and extending from the first wall to the second wall to form with the first wall, the second wall, and the two side walls, three cooling channels of the at least one cooling channel extending between the hinge joint and the plow end.

12. The nozzle of claim 11, wherein a cross-sectional area of at least one of the three cooling channels of each of the divergent flaps is not equal to the cross-sectional area of another of the three cooling channels.

13. The nozzle of claim 11, wherein a distance between the interior wall and two side walls of each of the divergent flaps varies between the hinge joint and the plow end.

14. The nozzle of claim 13, wherein a distance between the first wall and the second wall of each of the divergent flaps varies between the hinge joint and the plow end.

15. A method for making a divergent flap for a convergent and divergent nozzle, the method comprising:
building the divergent flap by a layer-by-layer additive manufacturing process;
forming, while building the divergent flap, a hinge joint and a plow structure at a plow end of the divergent flap opposite the hinge joint;
and integrally forming at least one cooling channel together with the hinge joint and the plow structure by forming first and second walls extending from the hinge joint to the plow structure with two side walls therebetween,
the cooling channel extending between the hinge joint and the plow end,
the second wall having a thickness that increases from the hinge joint to a middle of the divergent flap and decreases from the middle of the divergent flap to the plow end, and
a distance between the first wall and the second wall decreasing from the hinge joint to the middle of the divergent flap and increasing from the middle of the divergent flap to the plow end to produce increased convection cooling between the hinge joint and the plow end.

16. The method of claim 15, further including integrally forming with the at least one cooling channel, a plurality of effusion cooling holes fluidly connecting the at least one cooling channel to an exterior surface of the divergent flap.

17. The method of claim 15, further including integrally forming three cooling channels from the at least one cooling channel together with the hinge joint and the plow structure, each of the three cooling channels extending between the hinge joint and the plow end.

18. The method of claim 15, wherein additively manufacturing includes using laser powder deposition.

* * * * *